(12) United States Patent
O'Hara et al.

(10) Patent No.: US 11,321,332 B2
(45) Date of Patent: May 3, 2022

(54) AUTOMATIC FREQUENCY RECOMMENDATION FOR TIME SERIES DATA

(71) Applicant: BUSINESS OBJECTS SOFTWARE LTD., Dublin (IE)

(72) Inventors: Paul O'Hara, Dublin (IE); Ying Wu, Maynooth (IE); Esther Rodrigo Ortiz, Castleforbes (IE); Paul O'Connor, Lucan (IE); Gabor Szabo, Dublin (IE); Artur Stulka, TBD (IE)

(73) Assignee: Business Objects Software Ltd., Ra'anana (IL)

( * ) Notice: Subject to any disclaimer, the term of this patent is extended or adjusted under 35 U.S.C. 154(b) by 176 days.

(21) Appl. No.: 16/876,463

(22) Filed: May 18, 2020

(65) Prior Publication Data
US 2021/0357401 A1    Nov. 18, 2021

(51) Int. Cl.
| | | |
|---|---|---|
| G06F 16/00 | (2019.01) | |
| G06F 16/2458 | (2019.01) | |
| G06F 17/18 | (2006.01) | |
| G06F 16/23 | (2019.01) | |

(52) U.S. Cl.
CPC ...... *G06F 16/2477* (2019.01); *G06F 16/2379* (2019.01); *G06F 17/18* (2013.01)

(58) Field of Classification Search
CPC .. G06F 16/2477; G06F 16/2379; G06F 17/18; G06F 16/24568; G06F 16/254; G06F 16/258; G16H 10/60
See application file for complete search history.

(56) References Cited

U.S. PATENT DOCUMENTS

| | | | | |
|---|---|---|---|---|
| 7,092,929 | B1* | 8/2006 | Dvorak | G06Q 10/087 |
| | | | | 705/28 |
| 8,200,454 | B2* | 6/2012 | Dorneich | G06Q 30/0202 |
| | | | | 702/179 |
| 9,529,899 | B2* | 12/2016 | Hao | G06F 16/34 |
| 9,542,532 | B1* | 1/2017 | McNair | G16H 70/20 |
| 9,760,900 | B2* | 9/2017 | Sewak | G06Q 30/0202 |
| 10,964,416 | B1* | 3/2021 | Stack | G06F 3/0482 |
| 11,062,223 | B2* | 7/2021 | Xu | G06N 7/005 |
| 2004/0073534 | A1* | 4/2004 | Robson | G16B 50/00 |

(Continued)

OTHER PUBLICATIONS

U.S. Appl. No. 16/867,036, filed May 5, 2020, Murphy et al.

(Continued)

*Primary Examiner* — Noosha Arjomandi
(74) *Attorney, Agent, or Firm* — Fish & Richardson P.C.

(57) ABSTRACT

The present disclosure involves systems, software, and computer implemented methods for automatically recommending one or more frequencies for time series data. One example method includes receiving a request for an insight analysis for an input time series included in a dataset. For each of multiple frequencies to analyze, the input time series is transformed into a frequency time series. An absolute percentage change impact factor and an absolute trend impact factor are determined for each frequency time series. A frequency interest score is determined based on the determined absolute percentage change factors and the determined absolute trend impact factors, for each time frequency time series. The frequency interest score is provided for at least some of the frequency time series.

20 Claims, 12 Drawing Sheets

(56) References Cited

U.S. PATENT DOCUMENTS

| | | | | |
|---|---|---|---|---|
| 2011/0087966 | A1* | 4/2011 | Leviathan | G06F 16/9577 |
| | | | | 715/745 |
| 2014/0136454 | A1* | 5/2014 | Hirade | G06N 20/00 |
| | | | | 706/12 |
| 2016/0255109 | A1* | 9/2016 | Koyanagi | H04L 63/1416 |
| | | | | 726/23 |
| 2017/0286531 | A1* | 10/2017 | Zhang | G06F 16/3346 |
| 2017/0364818 | A1 | 12/2017 | Wu et al. | |
| 2018/0024901 | A1* | 1/2018 | Tankersley | G06F 16/2379 |
| | | | | 707/694 |
| 2018/0052804 | A1* | 2/2018 | Mikami | G06N 7/005 |
| 2018/0150547 | A1* | 5/2018 | Pallath | G06F 16/285 |
| 2018/0165418 | A1* | 6/2018 | Swartz | G16H 50/30 |
| 2018/0285769 | A1 | 10/2018 | Wu et al. | |
| 2018/0330248 | A1* | 11/2018 | Burhanuddin | G06N 20/10 |
| 2019/0179835 | A1 | 6/2019 | Pallath et al. | |
| 2019/0370610 | A1* | 12/2019 | Batoukov | G06F 11/0793 |
| 2020/0098055 | A1 | 3/2020 | O'Hara et al. | |
| 2020/0133441 | A1* | 4/2020 | Smith | G06F 3/0481 |
| 2020/0176121 | A1* | 6/2020 | Dalal | G16H 50/30 |
| 2020/0313971 | A1* | 10/2020 | Madhavan | H04L 43/067 |
| 2021/0304283 | A1* | 9/2021 | Saad | G06N 5/04 |
| 2021/0306804 | A1* | 9/2021 | Adler | H04W 4/029 |
| 2021/0312086 | A1* | 10/2021 | Kim | G06F 21/6263 |
| 2021/0349898 | A1* | 11/2021 | Schuerings | G06F 16/182 |

OTHER PUBLICATIONS

U.S. Appl. No. 16/876,441, filed May 18, 2020, Wu et al.
U.S. Appl. No. 16/877,909, filed May 19, 2020, O'Hara et al.
U.S. Appl. No. 16/890,430, filed Jun. 2, 2020, Banerjee et al.
Statisticshowto.datasciencecentral.com [online],"Mann Kendall Trend Test" available on or before Mar. 31, 2019, via Internet Archive: Wayback Machine URL <https://web.archive.org/web/20190331142332/https://www.statisticshowto.datasciencecentral.com/mann-kendall-trend-test/>, retrieved on 6/4/202, URL <https://www.statisticshowto.datasciencecentral.com/mann-kendall-trend-test/>, 4 pages.

* cited by examiner $$\text{Frequency}_{\text{absolute percentage change factor}} = \left(\frac{|\text{abs pct change} - \mu_{\text{short}}|}{\sigma_{\text{short}}}\right) * \sigma_{\text{abs relative difference}}$$

Where:  602

- abs pct change: absolute percentage change between the selected time point of interest and pervious time point  604
- $\mu_{\text{short}}$: the mean of the shortest sample absolute percentage change time series  606
- $\sigma_{\text{short}}$: the standard deviation of the shortest sample absolute percentage change time series  608
- $\sigma_{\text{abs relative difference}} = 1 + \dfrac{\left|\dfrac{\sigma_{\text{short}}}{\mu_{\text{short}}} - \dfrac{\sigma_{\text{long}}}{\mu_{\text{long}}}\right|}{\frac{1}{2}\left(\dfrac{\sigma_{\text{short}}}{\mu_{\text{short}}} - \dfrac{\sigma_{\text{long}}}{\mu_{\text{long}}}\right)}$  610 the relative difference between the longest and shortest sample absolute percentage change time series

| Frequency | Absolute % Change | $\mu_{short}$ | $\sigma_{short}$ | $\mu_{long}$ | $\sigma_{long}$ | $\sigma_{abs\ relative\ difference}$ | Abs Percentage Change Factor |
|---|---|---|---|---|---|---|---|
| Month | 24.15 | 15.99 | 16.83 | 16.78 | 16.29 | 1.08 | 0.52  1102 |
| Quarter | 1.36 | 19.14 | 6.65 | 17.20 | 8.46 | 1.34 | 3.59  1104 |
| Year | 32.71 | - | - | - | - | - | - |

FIG. 11B — 1110

| Frequency | Long Time Series | | | Medium Time Series | | | Short Time Series | | |
|---|---|---|---|---|---|---|---|---|---|
| | Trend All | Trend Less Latest | Abs Trend Impact | Trend All | Trend Less Latest | Abs Trend Impact | Trend Complete | Trend Less Latest | Abs Trend Impact |
| Month | 5.64 | 5.78 | 0.02  1118 | 4.28 | 4.55 | 0.06  1122 | 1.72 | 2.27 | 0.31  1126 |
| Quarter | 3.33 | 3.11 | 0.06  1120 | 2.80 | 2.59 | 0.07  1124 | 1.20 | 0.93 | 0.21  1128 |
| Year | - | - | - | - | - | - | - | - | - |

FIG. 11C — 1140

| Frequency | abs trend impact$_{short}$ | $A_{short}$ | abs trend impact$_{medium}$ | $A_{medium}$ | abs trend impact$_{long}$ | $A_{long}$ | Abs Trend Impact Factor |
|---|---|---|---|---|---|---|---|
| Month | 0.31 | 1 | 0.06 | 0.5 | 0.02 | 0.35 | 0.36  1142 |
| Quarter | 0.21 | 1 | 0.07 | 0.5 | 0.06 | 0.35 | 0.27  1144 |
| Year | - | - | - | - | - | - | - |

FIG. 11D — 1150

| Frequency | Abs Percentage Change Factor | Abs Trend Impact Factor | Frequency Interest Score |
|---|---|---|---|
| Month | 0.02 | 0.36 | 0.188  1152 |
| Quarter | 0.06 | 0.27 | 1.004  1154 |
| Year | - | - | - |

AUTOMATIC FREQUENCY RECOMMENDATION FOR TIME SERIES DATA

TECHNICAL FIELD

The present disclosure relates to computer-implemented methods, software, and systems for automatically recommending one or more frequencies for time series data.

BACKGROUND

A time series can include data points organized in time order. A stored time series can include a data value and a corresponding time value associated with the data value. Accordingly, a time series can be a sequence of data value/time value pairs. Time series can exist for various types of data and various types of applications.

SUMMARY

The present disclosure involves systems, software, and computer implemented methods for automatically recommending one or more frequencies for time series data. An example method includes: receiving a request for an insight analysis for an input time series included in a dataset; identifying multiple frequencies to analyze; for each identified frequency to analyze, transforming the input time series into a frequency time series for the frequency; determining an absolute percentage change impact factor for each frequency time series, wherein the absolute percentage change impact factor for a given frequency time series indicates a magnitude of impact of an absolute percentage change between time points of the frequency time series; determining an absolute trend impact factor for each frequency time series, wherein the absolute trend impact factor for a given frequency time series indicates an impact that a time series data point of focus has on the trend of the frequency time series; determining, based on the determined absolute percentage change factors and the determined absolute trend impact factors, a frequency interest score, for each time frequency time series, that combines the absolute percentage change impact factor and the absolute trend impact factor for the frequency time series; and providing, for at least some of the frequency time series, the frequency interest score for the frequency time series.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 illustrates formulas that can be used for calculating an absolute percentage change factor.

FIG. 11A is a table that illustrates results from performing an absolute percentage change algorithm for an example time series.

FIGS. 11B and 11C are tables that respectively illustrate results from performing an absolute trend impact factor algorithm for an example time series.

FIG. 11D is a table that illustrates frequency recommendation score results for an example time series.

DETAILED DESCRIPTION

Figure 1:
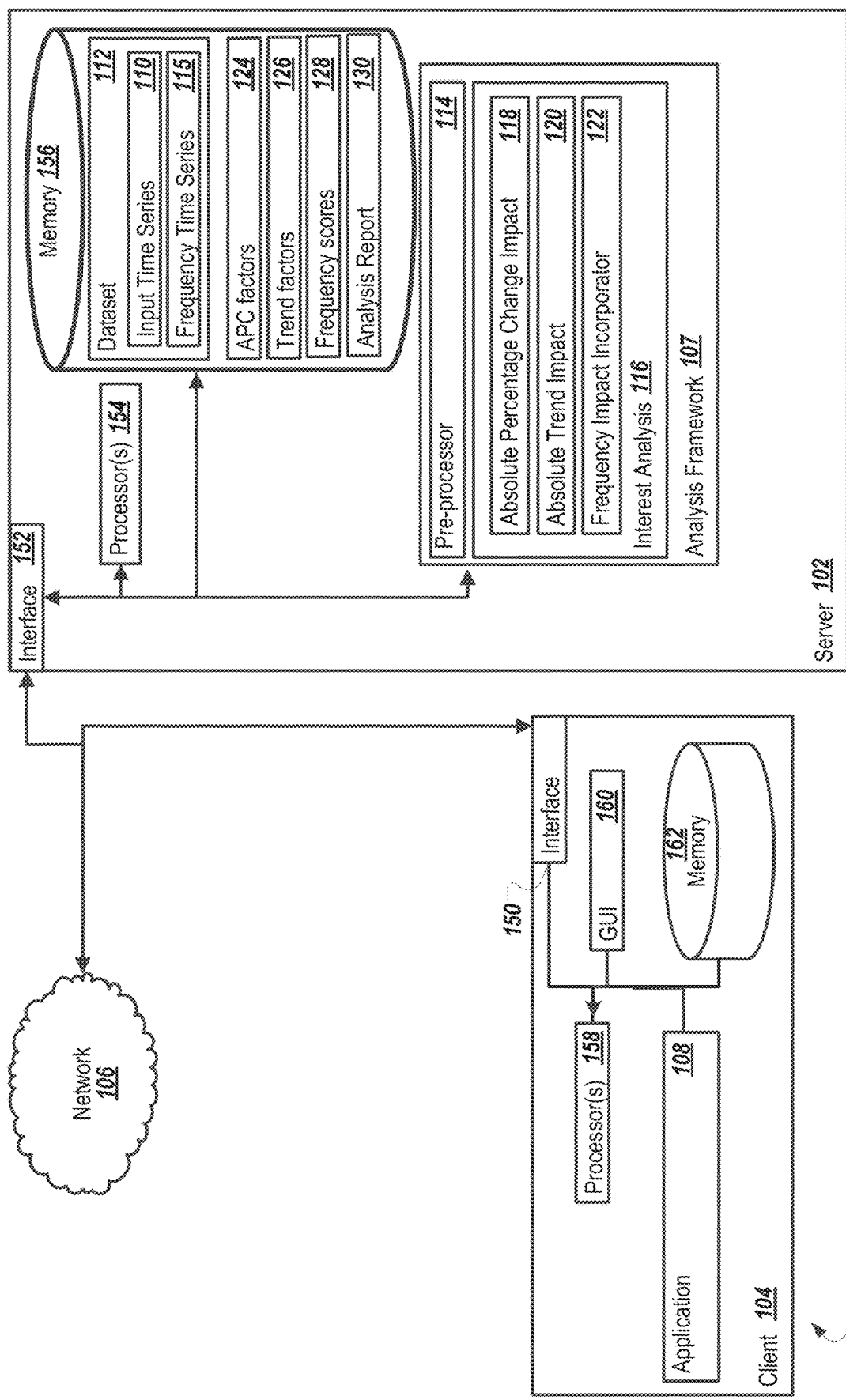
FIG. 1 is a block diagram illustrating an example system for automatically recommending one or more frequencies for time series data.

Time series analysis is a process that can be applied to a time series to gain understanding into the underlying patterns and structure of the observed time series data. Example structures and patterns that can exist within a time series include seasonality, trends, and irregularity. Seasonality detection can include identification of repeating patterns or cycles within a time series over time. Trends can be reflected by increasing or decreasing behavior of a time series over time. Irregularity can represent inherent variability within a time series that is unable to be explained (e.g., noise).

Time series analysis can involve identifying a frequency (e.g., day, week, month, quarter, half year, year, etc.) where important and/or interesting information exists within a time series for either the entire time series or selected data points of the time series. For example, a time series can be analyzed in an original form at a default frequency and also at other frequencies. For instance, an original time series may be rainfall for the month, but daily, weekly, or quarterly levels of rainfall can also be analyzed.

Analyzing a time series at different levels may lead to different insights or recognition of different patterns. Some frequencies may be better for gaining insights than other frequencies, for instance. A particular behavior of a times series may not be apparent (or as apparent) at an original/default frequency, but may be apparent (or more apparent) at a different frequency.

Frequency analysis can be very time consuming, involving a human user performing a manual analysis across multiple frequencies and subsequently comparing the results of each analysis. Rather than manual analysis of time series frequencies, important and/or interesting information in a time series can be automatically processed, identified, and scored across multiple frequencies using an automated framework. The framework can automatically generate one or more recommendations for a time series for viewing the time series at one or more recommended frequencies that include strongest behavioral signals for selected data point(s) in the time series.

The framework can include application of statistical techniques to extract important and interesting information from a time series for a selected time point across several frequencies to generate an automatic recommendation for at least one frequency that suggests strongest level(s) of information and interest. In response to selection of a data point in a time series, multiple interest analyses can be performed, from alternative perspectives on the time series, across multiple frequencies. For each frequency, the output from each analysis can be combined to produce a frequency score. Higher frequency scores can indicate frequencies that include the most information and interest for the selected data point.

Automatic frequency recommendation can save time and resources for an organization. Timely and valuable insights can be provided at a rate not possible with manual efforts. Additionally, an automated approach can result in more consistent and accurate results as compared to manual methods. Accordingly, an increase in understanding of patterns and structures that can exist within time series can be enjoyed by organizations.

The automated framework can bring various other benefits to an organization through improved performance of descriptive analysis, explanative analysis, and forecasting. Using insights of detected trends and seasonality factors obtained by improved descriptive analysis, organizations can proactively adjust business goals and objectives. As another example, the organization can use improved descriptive analysis techniques to study whether newly received data is deviating from past behavior or patterns. Improved forecasting can result in improved predictions about future model behavior based on historical patterns and trends. Improved explanative analysis can be used for studying correlations, relationships, and dependencies between two time series.

Improved time series analysis can provide benefits to various types of fields. For example, economic forecasting, sales forecasting, budgetary analysis, stock market analysis, census analysis, and inventory management can be improved by more timely, more accurate insights obtained from analysis of relevant time series at recommended frequencies. The automated framework can be applied to any time series and to any frequency level. Analysis can be focused on most recent data points of an input time series or to any data point within a time series dataset.

As described in further detail below, the framework can use an algorithm that aggregates outputs related to trend impact and percentage change deviation to produce a score per analyzed frequency, thus enabling automatic frequency recommendation for a time series. The framework can use an algorithm to determine the magnitude of impact for a selected time series data point percentage change against the previous data point, relative to all other percentage changes on the time series. Another algorithm can be used to determine the impact a selected time series data point has on the trend of the time series. A time series frequency interest incorporator can produce a recommended default frequency level at which to view a time series. For instance, an incorporation algorithm can be performed to produce a frequency recommendation score representing, for the selected time data point, an aggregation of identified absolute trend impact and absolute percentage change deviation behavioral information for each analyzed frequency.

FIG. 1 is a block diagram illustrating an example system 100 for automatically recommending one or more frequencies for time series data. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

An analysis framework 107 can enable the recommendation of one or more frequencies (e.g., day, week, month, quarter, etc.) that includes strongest behavioral signals based on a selected data point in the time series. For instance, a user of the client device 104 can use an application 108 to send a request for an insight analysis to the server 102. The request can be to perform an insight analysis on a time series 110 that is included in a dataset 112 either stored at or accessible by the server 102. Although described as a client-server setup, in some implementations, functionality of some or all of the analysis framework 107 can be implemented in the application 108.

The time series 110 can include time-based data from a variety of environments. For instance, the time series 110 can include data representing hourly readings of air temperature, daily closing prices of a company's stock, total monthly rainfall amounts for an area, yearly sales figures for a store, or other types of data at various frequencies.

The analysis framework 107 includes a pre-processor 114 and an interest analysis component 116. The pre-processor 114 can transform the time series 110 into multiple frequency time series 115 at specified frequency levels and provide the multiple frequency time series 115 to the interest analysis component 116. The interest analysis component 116 can perform multiple analyses on each frequency time series 115 and combine the analysis results to produce a recommendation score for each frequency time series.

The interest analysis component 116 includes an absolute percentage change impact component 118, an absolute trend impact component 120, and a frequency impact incorporator 122. The absolute percentage change impact component 118 can perform an Absolute Percentage Change (APC) impact algorithm for each frequency time series 115 to generate an APC factor 124 for each frequency time series 115 that indicates a magnitude of impact an absolute percentage change between a time series data point of focus and a previous data point in the frequency time series 115 has on time series behavior. The absolute trend impact component 120 can perform an absolute trend impact algorithm for each frequency time series 115 to generate a trend factor 126 for each frequency time series 115 that indicates an impact the time series data point of focus has on the trend of the frequency time series 115.

The frequency impact incorporator 122 can combine the APC factor 124 and the trend factor 126 for each frequency time series 115 to generate a frequency score 128 for each analyzed frequency. A higher frequency score indicates a higher level of interest for the frequency. An analysis report 130 that includes one or more ranked frequency scores 128 for can be sent to the client device 104 for presentation in the application 108. In some cases, only highest ranked frequency score(s) 128, or a set of relatively higher frequency scores, are provided. In general, frequency scores 128 can be provided to users and/or can be provided to other systems (e.g., to be used in other data mining or machine learning processes).

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100 connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application 108. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a genetic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
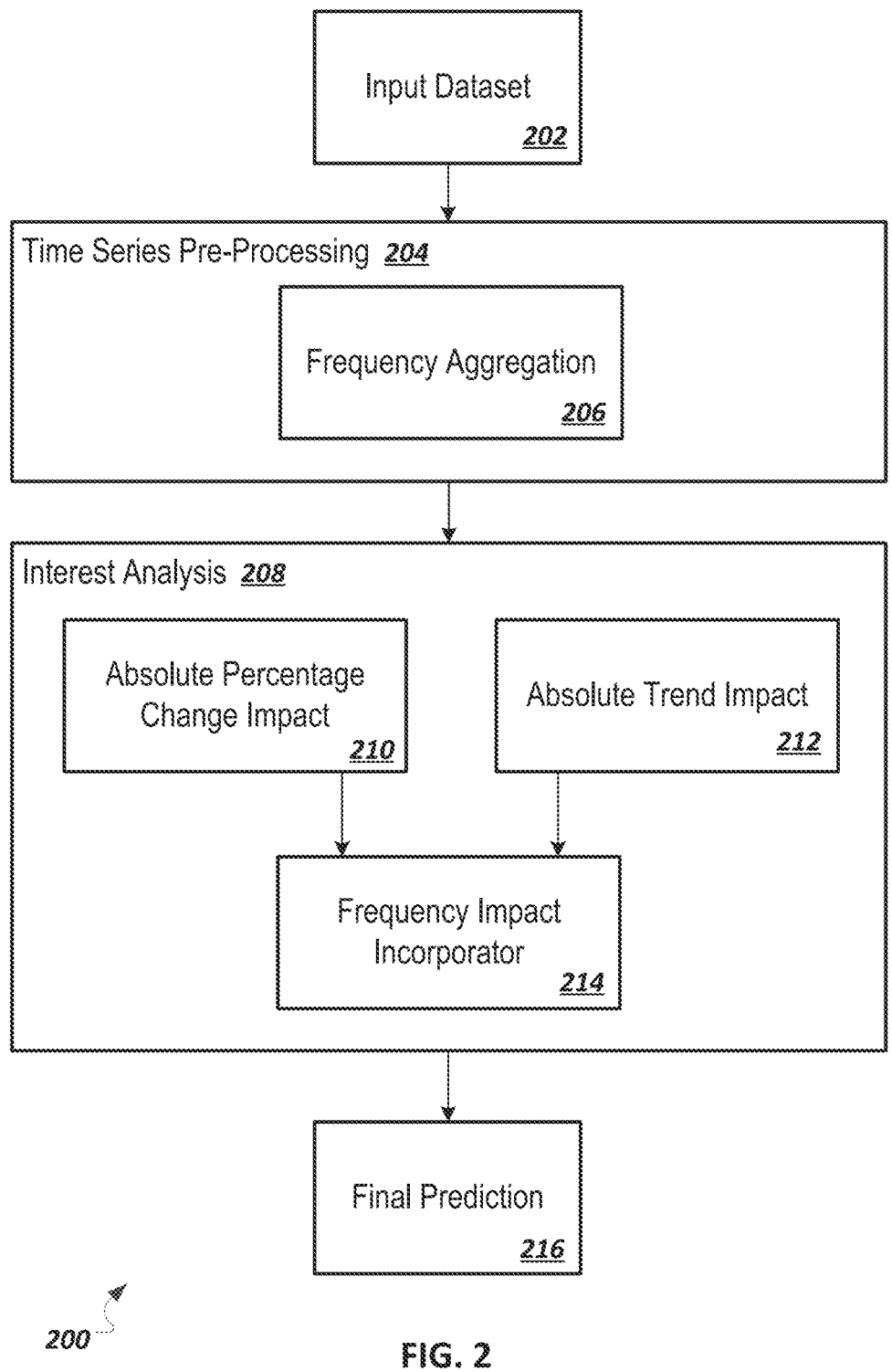
FIG. 2 illustrates an example system for automatic time series frequency recommendation.

FIG. 2 illustrates an example system 200 for automatic time series frequency recommendation. The system 200 can provide a framework that can be applicable to any input dataset where values are entered in a sequence ordered by time.

An input data set 202 is provided to a time series pre-processing component 204. Time series pre-processing can include frequency aggregation 206. Output of the time series pre-processing component 204 can be provided to an interest analysis component 208. Interest analysis can include absolute percentage change impact processing 210, absolute trend impact processing 212, and frequency impact incorporation 214. Output of the interest analysis component can be a final prediction 216.

Frequency aggregation 206 can include transforming the input data set 202 into multiple time series, at specified frequency levels, for preparation for analysis of the multiple time series. The absolute percentage change impact processing 210 can include processing each frequency time series to obtain a factor indicating how interesting (e.g., a level of insight of) an impact of an absolute percentage change between a time series data point of focus and a preceding time point is in relation to a frequency time series. The absolute trend impact processing 212 can include processing each frequency time series to obtain a factor indicating an impact a time series data point of focus has on a trend of the time series. The frequency impact incorporation 214 can include processing outputs from the absolute percentage change impact processing 210 and the absolute trend impact processing 212 to product a score for each frequency time series that represents a behavioral effect a selected time series data point of focus has on the frequency time series. The final prediction 216 can be a frequency associated with a relatively highest score, where the higher score indicates that the frequency exhibits a strongest behavioral effect for the selected time series data point of focus. The final prediction 216 can be a recommended default frequency.

Figure 3:
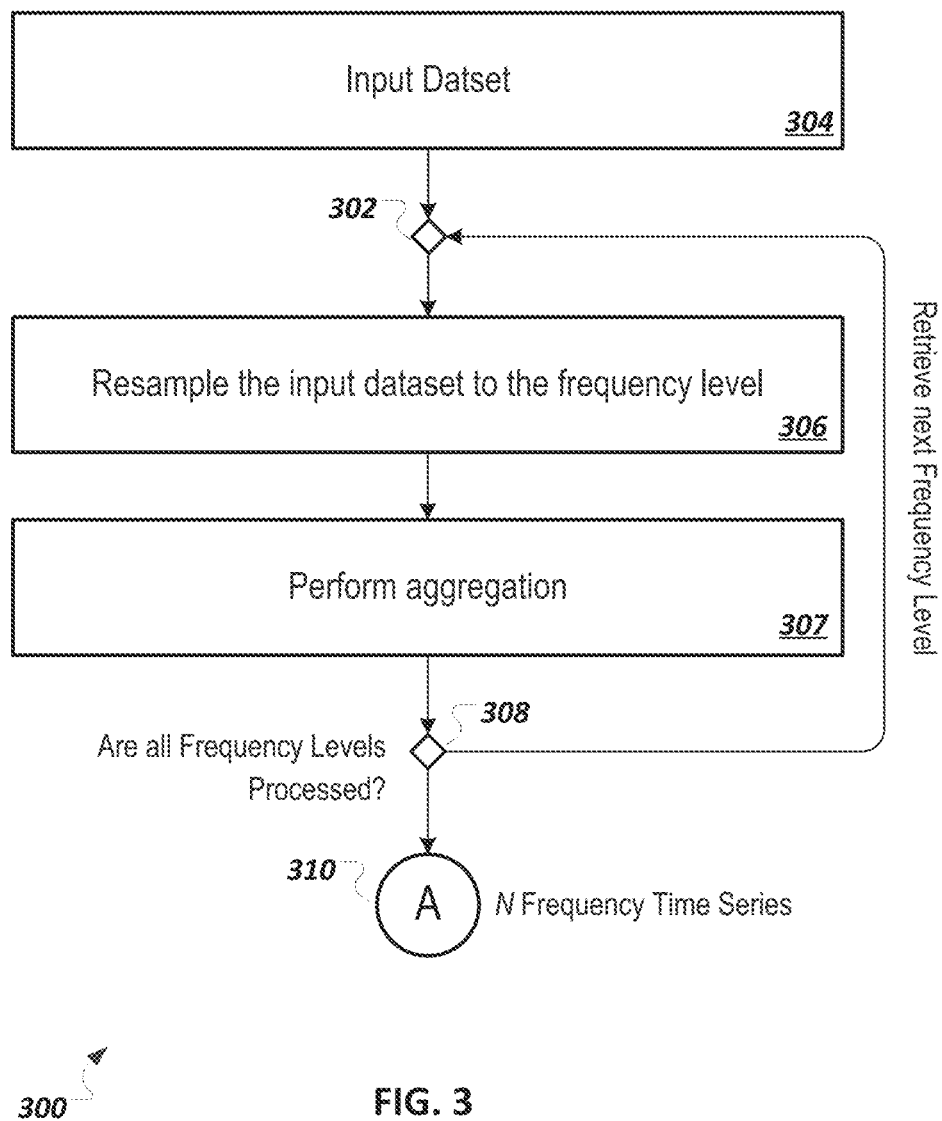
FIG. 3 is a flowchart of example method for frequency aggregation.

FIG. 3 is a flowchart of example method 300 for frequency aggregation. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the pre-processor 114 of FIG. 1.

At 302, a first frequency level of an input data set 304 is identified. A frequency level can represent a frequency to which an input data set 304 is to be transformed. Examples frequency levels can include minute, hour, day, week, month, quarter, half-year, year, etc.

At 306, the input data set 304 is resampled to the first frequency level. The input data set 304 may be daily rainfall, for example. The first frequency level to which to transform the input data set 304 may be monthly rainfall, for instance. Resampling can include identifying multiple daily entries for each month of the time series, for example.

At 307, an aggregation is performed. Different type of aggregations can be performed. When the first frequency level is monthly, an aggregation can be performed on the identified daily entries for the month. An average can be computed, for instance. For the rainfall example, an aggregation can be performed to calculate average daily rainfall amounts for each month of the time series.

At 308, a determination is made as to whether all frequency levels of the input data set 304 have been processed. If not all of the frequency levels of the input data set 304 have been processed, a next frequency level is retrieved and processed. If all frequency levels of the input data set 304 have been processed, an output 310 of N frequency time series can be provided to a next component (e.g., an interest analysis component), where N equals a number of frequency levels in the input data set 304.

Figure 4:
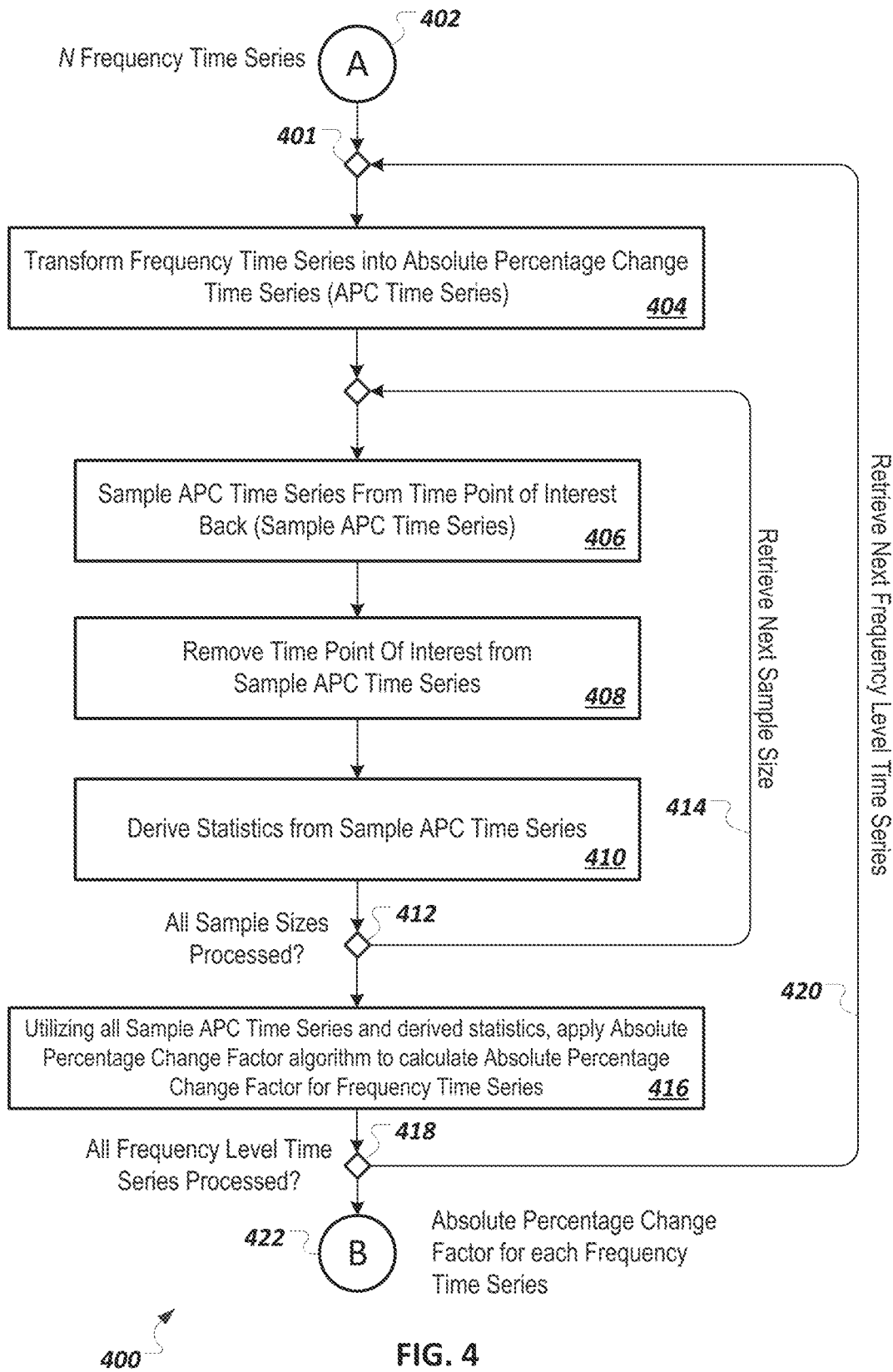
FIG. 4 is a flowchart of example method for calculating an absolute percentage change impact factor.

FIG. 4 is a flowchart of example method 400 for calculating an absolute percentage change impact factor. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the absolute percentage change impact component 118 of FIG. 1.

At 401, a first frequency time series in an input 402 of N frequency times series is identified.

At 404, the first frequency time series is transformed into an absolute percentage change (APC) time series. An APC time series can compute a percentage change between each time point in the time series and the prior time point. An APC time series can be calculated using formula (1) below:

$$\left| \frac{x_i - x_{i-1}}{x_{i-1}} \right| \quad (1)$$

where $x_i$ is a time point in the time series, and is a previous time point in the time series relative to the time point $x_i$.

Figure 5:
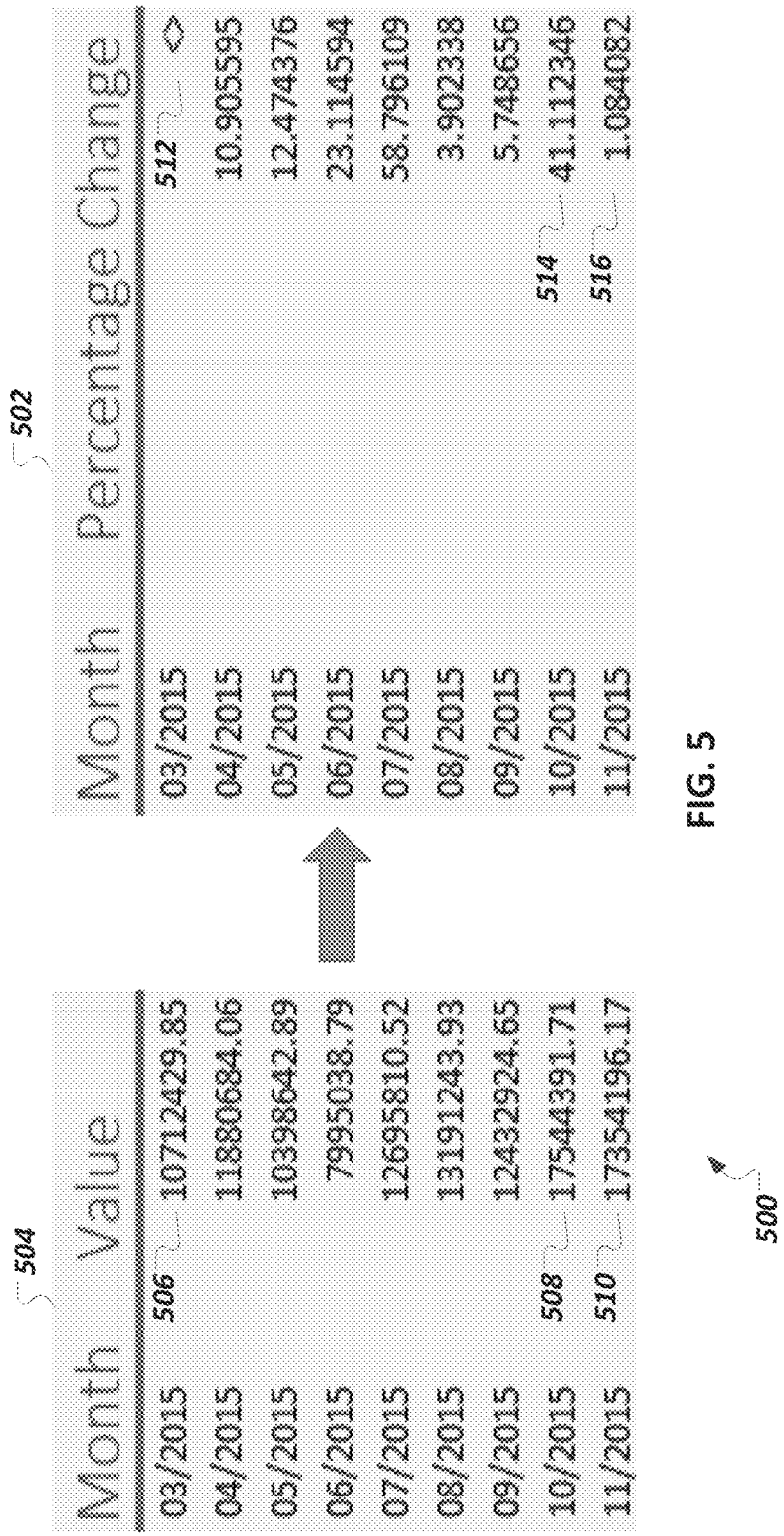
FIG. 5 illustrates an absolute percentage time series generated from a frequency time series.

FIG. 5 illustrates an APC time series 502 generated from a frequency time series 504. The frequency time series 504 includes a value for each of multiple time points, where time points are at monthly intervals. For example, the frequency time series 504 includes a value (506) of 10712429.85 for 03/2015, a value 17544391.71 (508) for 10/2015, and a value 17354196.17 (510) for 11/2015. In some implementations, a percentage change is not calculated for a first time point (e.g., as indicated by a "< >" indicator 512). Percentage changes can be calculated for other time points. For example, a percentage change (514) of 41.112346% has been calculated for 9/2015 to 10/2015. As another example, a percentage change (516) of 1.084082% has been calculated for 10/2015 to 11/2015.

Referring again to FIG. 4, at 406, for a first APC time series of a first frequency, the APC time series is sampled to create a first sample APC time series, starting at a time point of interest and sampling backwards in time. Other types of sample time series can be generated. The time point of interest can be a most recent time point or some other time point.

At 408, the time point of interest is removed from the first sample APC time series to create a second sample APC time series.

At 410, statistics are derived from the sample APC time series. The derived statistics are described in more detail below with respect to operation 416 and FIG. 6.

At 412, a determination is made as to whether all desired sample sizes have been processed. At least two samples, each of different lengths, can be used, for example.

At 414, if not all desired sample sizes have been processed, a next sample is retrieved, and operations 406, 408, and 410 are performed using the next sample.

At 416, if all sample sizes have been processed, an absolute percentage change factor algorithm is performed using all of the APC sample times series and derived statistics to calculate an absolute percentage change factor for the frequency time series. The APC change factor can represent a stability or volatility of the time series at and near the time point of interest.

As illustrated in FIG. 6 and discussed below, the absolute percentage change factor 602 for a frequency time series can be calculated using formula (2):

$$Frequency_{absolute\ percentage\ change\ factor} = \left( \frac{|abs\ pct\ change - \mu_{short}|}{\sigma_{short}} \right) * \sigma_{abs\ relative\ difference} \quad (2)$$

where abs pct change 604 is an absolute percentage change between the selected time point of interest and the previous time point, $\mu_{short}$ 606 is the mean of the shortest sample absolute percentage change time series, $\sigma_{short}$ 608 is the standard deviation of the shortest sample absolute percentage change time series, and $\sigma_{abs\ relative\ difference}$ 610 is an absolute value relative difference that can be calculated using formula (3) below (and formula 612 in FIG. 6).

$$1 + \frac{\left| \frac{\sigma_{short}}{\mu_{short}} - \frac{\sigma_{long}}{\mu_{long}} \right|}{\frac{1}{2}\left( \frac{\sigma_{short}}{\mu_{short}} - \frac{\sigma_{long}}{\mu_{long}} \right)} \quad (3)$$

At 418, a determination is made as to whether all frequency time series have been processed. At 420, if not all frequency time series have been processed, a next frequency time series is received (for a next level), and the method 400 is repeated using the next frequency time series.

If all frequency times series have been processed, an output 422 of the method 400, of an APC factor for each frequency times, is provided (e.g., to a frequency impact incorporator). The output 422 can be a vector of APC factors, one for each frequency time series, for example.

Figure 7:
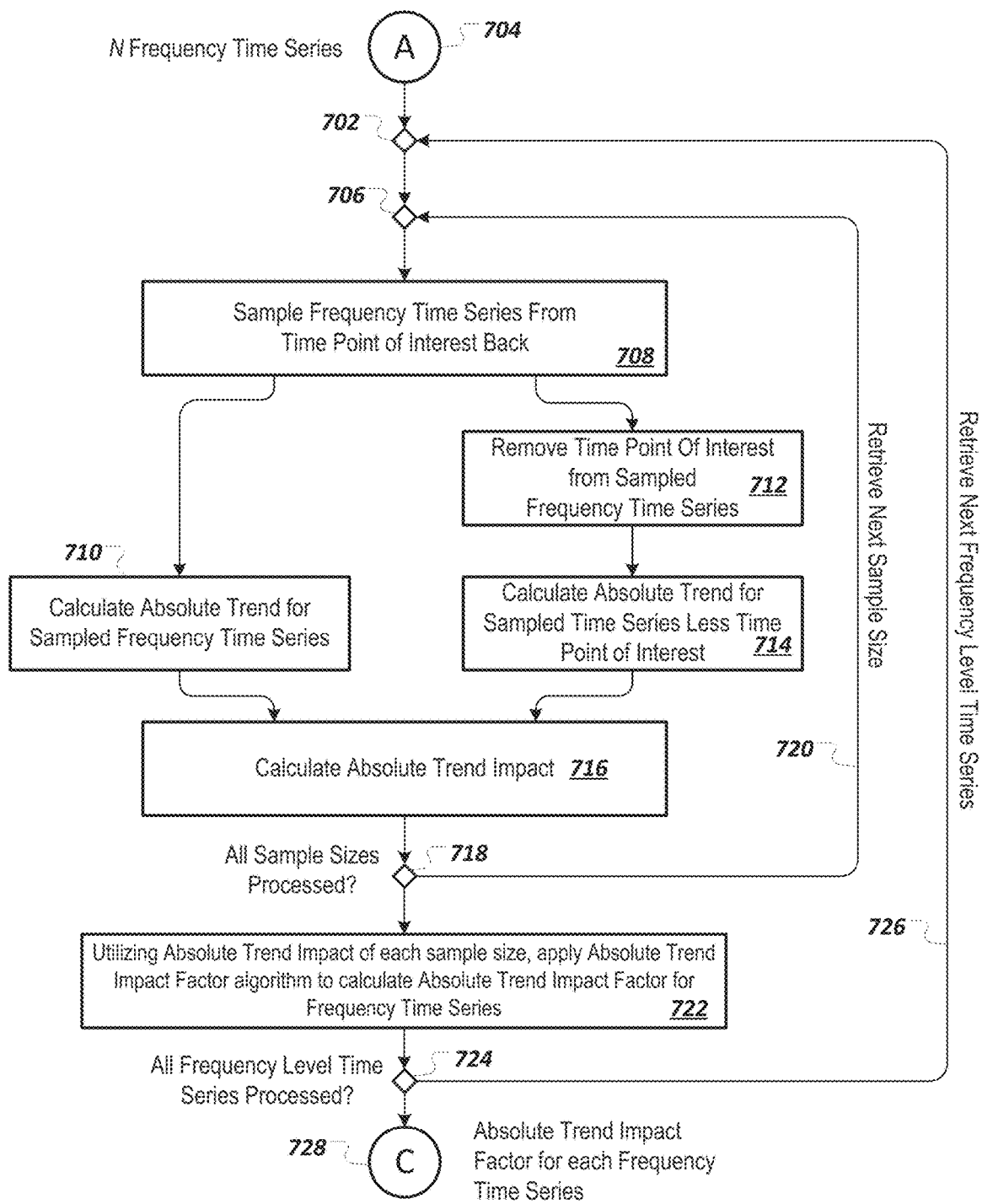
FIG. 7 is a flowchart of example method for calculating an absolute trend. impact factor.

FIG. 7 is a flowchart of example method for calculating an absolute trend impact factor. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the absolute trend impact component 120 of FIG. 1.

At 702, a first frequency time series in an input 704 of N frequency times series is identified.

At 706, a first sample size is determined. For example, multiple sample sizes can be processed. For instance, a first sample can use an entire time series and a second sample can be shorter, such as a portion (e.g., one half) of the time series. Various types and numbers of sample sizes can be used.

At 708, the frequency time series is sampled, based on the sample size and a time point of interest (which can be a latest or other time point), backwards from the time point of interest until the sample size is reached.

At 710, a first absolute trend value is calculated for the sampled frequency time series. Calculation of absolute trend values is described below.

At 712, in parallel with or after operation 710, the time point of interest is removed from the sampled frequency time series. At 714, a second absolute trend value is calculated for the sampled frequency time series less the time point of interest.

At 716, an absolute trend impact is calculated for the sample size, using for example, a formula of:

$$Frequency_{sample\ size\ reference}^{absolute\ trend\ impact} = \left| 1 - \left( \frac{|trend\ impact_{less\ latest}|}{|trend\ impact_{complete}|} \right) \right|.$$

The absolute trend impact can be calculated using a Mann-Kendall test, or some other algorithm capable of producing a value that represents a trend detection. The Mann-Kendall test can detect increasing or decreasing trends in a given times series. The range of output from the algorithm can be a value between 1 and −1, e.g., a trend impact. For an output trend impact value, a value towards 1 indicates increasing trend, a value towards zero indicating decreasing trend, and value near zero indicating no trend.

At 718, a determination is made as to whether all desired sample sizes have been processed. At least two samples, each of different sizes, can be used, for example.

At 720, if not all desired sample sizes have been processed, a next sample size is identified, and operations 708, 710, 712, 714, and 716 are performed using the next sample size.

At 722, if all sample sizes have been processed, an absolute trend impact factor algorithm is performed using all of the absolute trend impacts for the different sample sizes to calculate an absolute trend impact factor for the frequency time series. The absolute trend impact factor is a trend statistic that can describe the potential existence of a trend in a frequency time series. The absolute trend impact factor for the frequency time series can be calculated using a formula of:

$$frequency_{absolute\ trend\ impact\ factor} = \sum_{sample\ size\ reference=1}^{n} Frequency_{sample\ size\ reference}^{absolute\ trend\ impact} * \lambda_i$$

where:

$$\lambda = \sum_{i=0}^{n} 0.5^{x_i}$$

$$x = \sum_{i=0}^{n} \begin{cases} n\_i & \text{if } \frac{n}{2} = 0 \\ n\_i + 0.5 & \text{if } \frac{n}{2} > 0 \end{cases}$$

and n=number of time series samples.

At 724, a determination is made as to whether all frequency time series have been processed. At 726, if not all frequency time series have been processed, a next frequency time series is received (for a next level), and the method 700 is repeated using the next frequency time series.

If all frequency times series have been processed, an output 728 of the method 700, of an absolute trend impact factor for each frequency times, is provided (e.g., to a frequency impact incorporator). The output 728 can be a vector of absolute tend impact factors, one for each frequency time series, for example.

Figure 8:
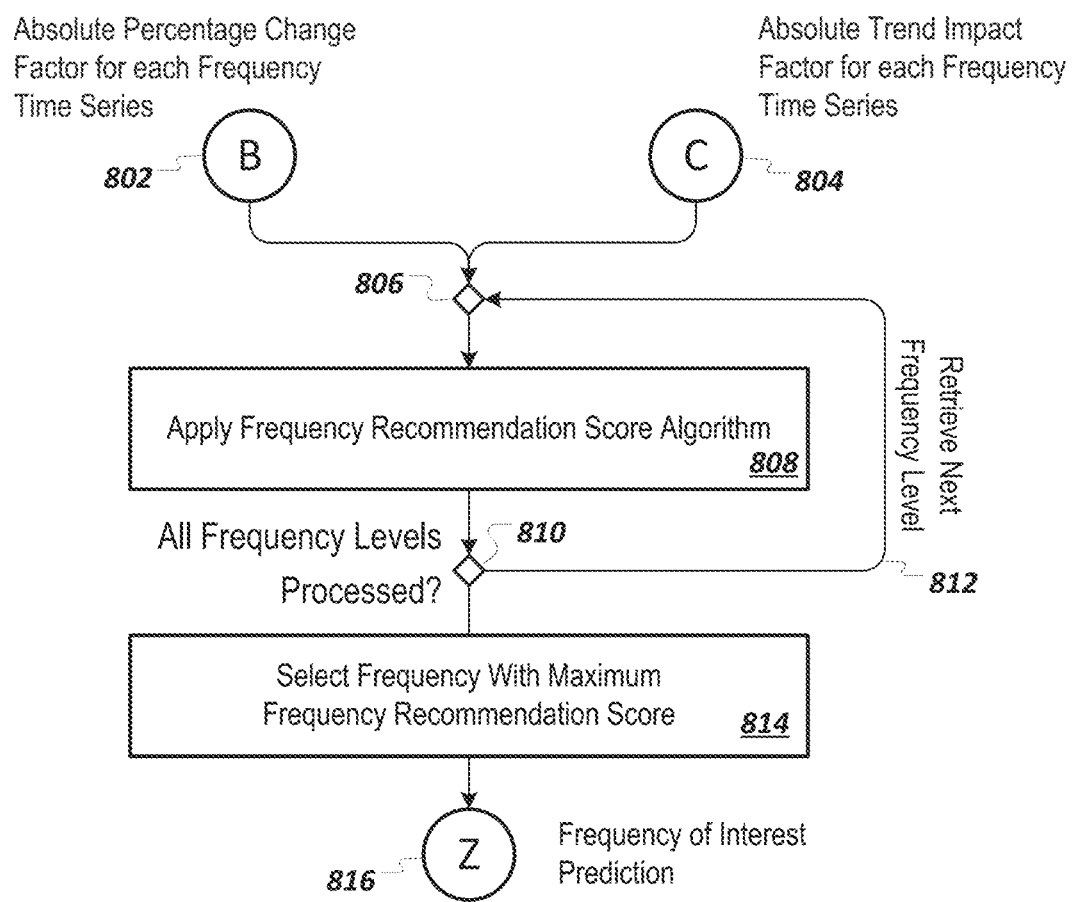
FIG. 8 is a flowchart of example method for frequency impact incorporation.

FIG. 8 is a flowchart of example method for frequency impact incorporation. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the frequency impact incorporator 122 of FIG. 1.

The method 800 can use an input 802 of an absolute percentage change factor for each frequency time series and an input 804 of an absolute trend impact factor for each frequency time series.

At 806, a frequency is selected among a set of frequencies.

At 808, a frequency recommendation score is computed for the selected frequency. A frequency recommendation score can be computed for the selected frequency by combining a corresponding absolute percentage change factor for the frequency and an absolute trend impact factor for the frequency. For example, the absolute percentage change factor for the frequency and the absolute trend impact factor for the frequency can be multiplied to generate the frequency recommendation score.

At 810, a determination is made as to whether all frequencies have been processed. At 812, if not all frequencies have been processed, a next frequency is selected, and the method 800 is repeated using the next frequency.

At 814, if all frequencies have been processed, a frequency with a maximum frequency recommendation score is selected as a frequency of interest. As another example, a set of frequencies with highest scores can be selected (e.g., all scores greater than a threshold or a top N scores).

At 816, the one or more selected frequencies of interest are included in a frequency of interest prediction (e.g., that is provided to a user or to another system).

Figure 9:
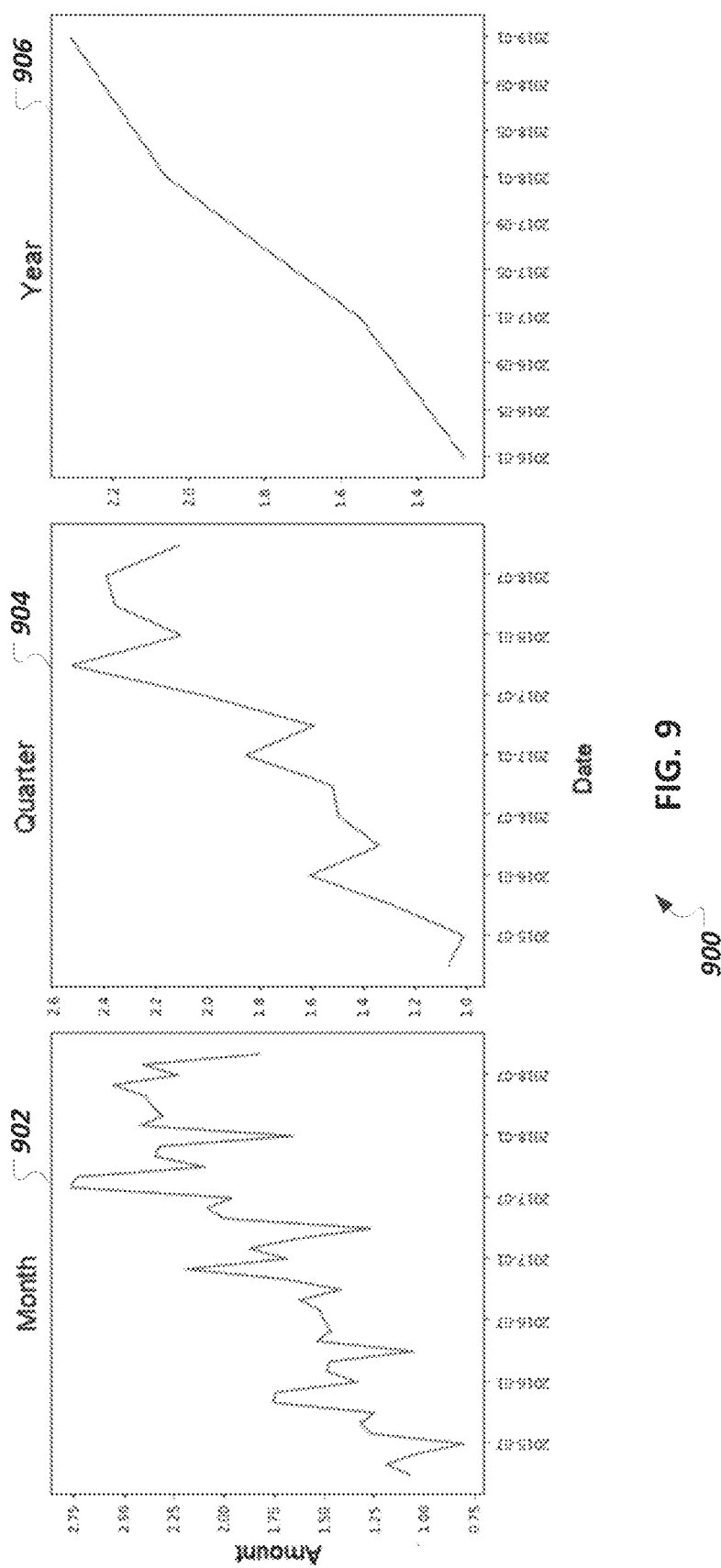
FIG. 9 is a graph that illustrates multiple example frequency time levels for an example time series dataset.

FIG. 9 is a graph 900 that illustrates multiple example frequency time levels for an example time series dataset. The example time series dataset represents revenue from bike rentals. An input time series has data organized at a monthly frequency level, as illustrated by a monthly graph 902. The input time series data is pre-processed to aggregate and transforming the input time series to multiple time series at multiple other frequency levels, as illustrated by a quarterly graph 904 and a yearly graph 906.

Interest analysis is applied to each frequency time series to generate and combine an absolute percentage change factor and an absolute trend impact interest factor to produce a frequency interest score for each time series frequency.

Figure 10:
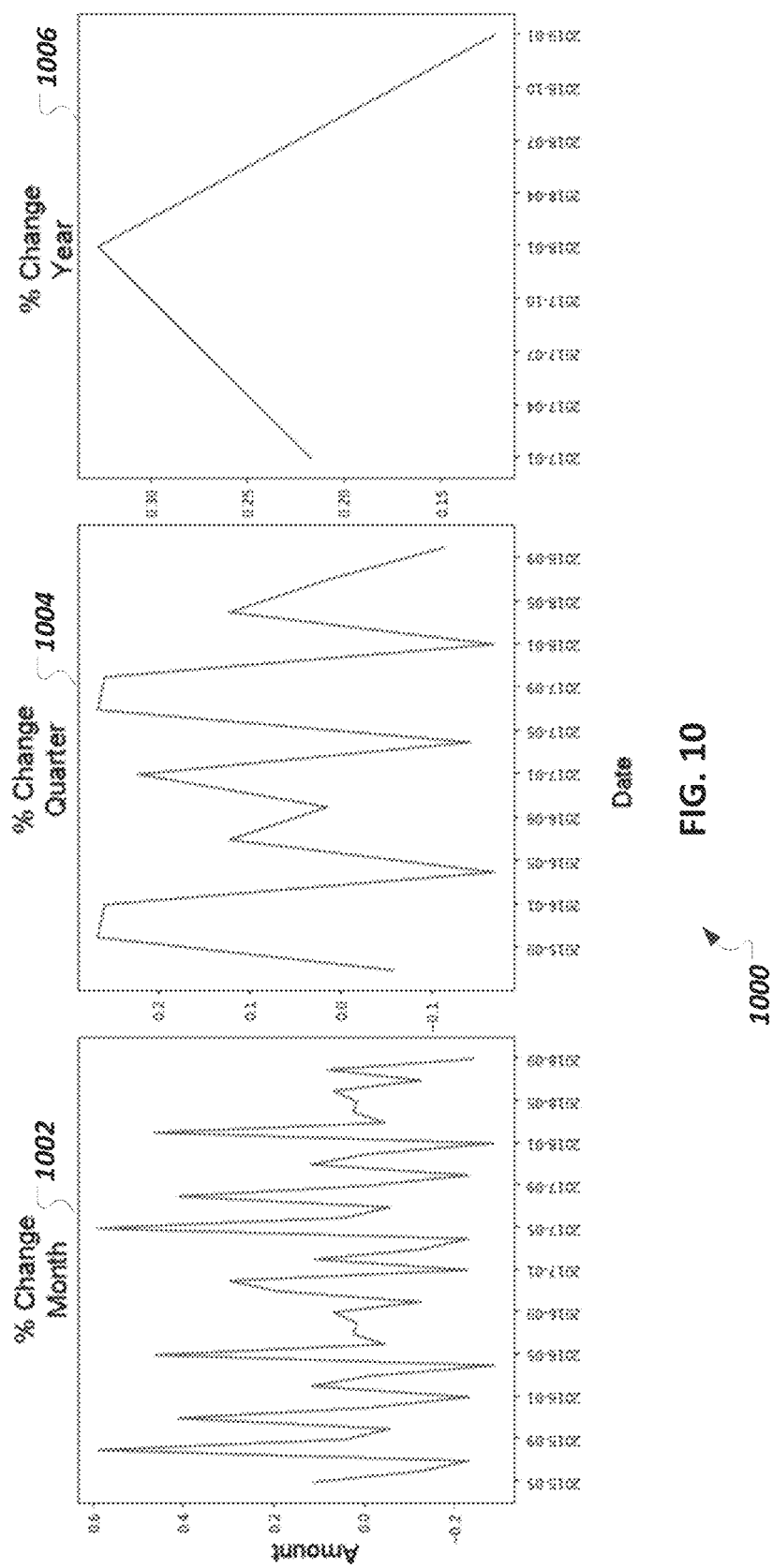
FIG. 10 illustrates an example absolute percentage change time series graph.

FIG. 10 illustrates an example absolute percentage change time series graph 1000. During absolute percentage change factor derivation, an absolute percentage change impact factor is produced for each frequency time series. Frequency times series (e.g., monthly, quarterly, yearly) can be transformed into the absolute percentage change time series (e.g., as illustrated by absolute percentage change times series graphs 1002, 1004, and 1006, respectively). Each absolute percentage change time series includes an absolute percentage change between each data point in the corresponding frequency time series.

FIG. 11A is a table 1100 that illustrates results from performing an absolute percentage change algorithm for an example time series. An insufficient number of data points may exist in the yearly frequency time series, so APC factors are computed for the monthly and quarterly frequency time series but not the yearly frequency time series. An APC factor (1102) of 0.52 is computed for the monthly frequency and an APC factor (1104) of 3.59 is computed for the quarterly frequency. The remainder of the table 1100 shows intermediate calculations.

FIGS. 11B and 11C are tables 1110 and 1140, respectively, that illustrate results from performing an absolute trend impact factor algorithm for an example time series. Three sample time series were used when calculating absolute trend factor impacts. For instance, a long sample 1112 (e.g., the original time series), a medium sample 1114 (e.g., 75% of the original time series and a short sample (e.g., 50% of the original time series) were used. An absolute trend impact factor was calculated for each sample, for each frequency time series. For instance, absolute trend impact values 1118 and 1120 were calculated using the long sample 1112, absolute trend impact values 1122 and 1124 were calculated using the medium sample 1112, and absolute trend impact values 1126 and 1128 were calculated using the short sample 1116, for the monthly and quarterly frequency time series, respectively. An absolute trend impact factor (1142) of 0.36 is computed for the monthly frequency and an absolute trend impact factor (1144) of 0.27 is computed for the quarterly frequency. The remainder of the table 1140 shows intermediate calculations.

FIG. 11D is a table 1150 that illustrates frequency recommendation score results for an example time series. Using previously-computed absolute percentage change factors and absolute trend impact factors for both a monthly and quarterly frequency, a frequency impact incorporator can combine calculated factors for a frequency to generate a frequency interest score for the frequency. For example, a frequency interest score (1152) of 0.188 is computed for the monthly frequency and a frequency interest score (1154) of 1.004 is computed for the quarterly frequency. Accordingly, a frequency recommendation can be provided (e.g., to a user) for the quarterly frequency as a frequency that includes the maximum frequency interest score. Of note, the quarterly frequency was not the default frequency for the input time series.

Figure 12:
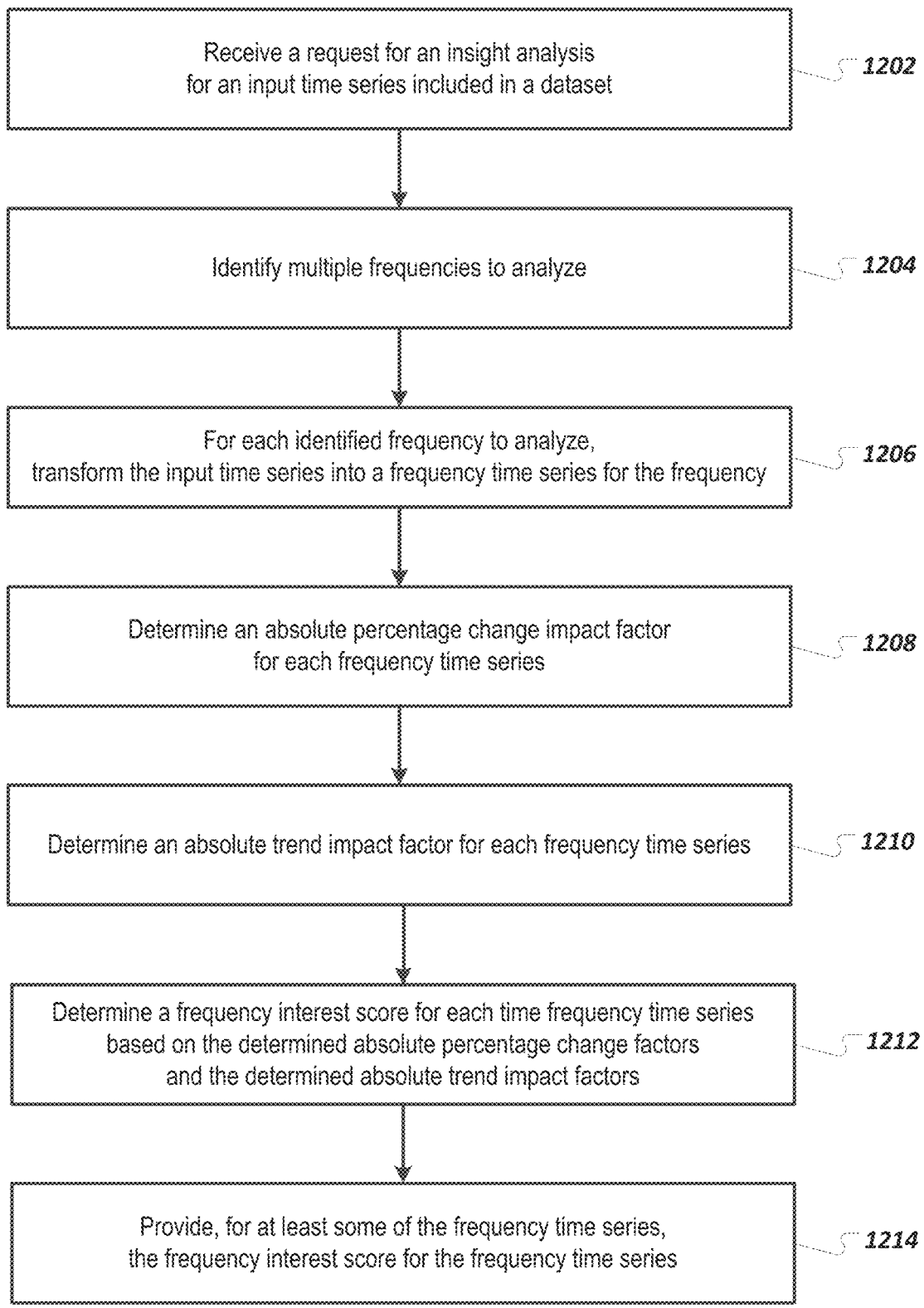
FIG. 12 is a flowchart of an example method for automatically recommending one or more frequencies for time series data.

FIG. 12 is a flowchart of an example method for automatically recommending one or more frequencies for time series data. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the analysis framework 107 of FIG. 1.

At 1202, a request is received for an insight analysis for an input time series included in a dataset.

At 1204, multiple frequencies to analyze are identified. The multiple frequencies can include a default frequency for the time series.

At 1206, the input time series is transformed into a frequency time series for the frequency, for each identified frequency to analyze. The input time series can be used as a frequency time series for the default frequency.

At 1208, an absolute percentage change impact factor is determined for each frequency time series. The absolute percentage change impact factor for a given frequency time series indicates a magnitude of impact of an absolute percentage change between time points of the frequency time series.

Determining the absolute percentage change impact factor for a frequency time series can include generating an absolute percentage change time series from the frequency time series that reflects a percentage change between each time point in the frequency time series and a prior time point in the frequency time series. Determining the absolute percentage change impact factor for a frequency time series can include generating at least two sample absolute percentage change time series from the absolute percentage change time series generated from the frequency time series. The absolute percentage change impact factor for a frequency time series can be based on a mean and a standard deviation of a shortest sample absolute percentage change time series and a mean and a standard deviation of a longest sample absolute percentage change time series.

At 1210, an absolute trend impact factor is determined for each frequency time series. The absolute trend impact factor for a given frequency time series indicates an impact that a time series data point of focus has on the trend of the frequency time series. The time point of interest can be a most recent, or some other time point.

The absolute trend impact factor for a frequency time series can indicate whether the frequency time series has an increasing trend or a decreasing trend, Determining the absolute trend impact factor for a frequency time series can include generating at least two sample time series based on the frequency time series. Determining the absolute trend impact factor for a frequency time series can include determining, for each sample time series, a first trend impact based on the sample time series and a second trend impact based on a reduced sample time series that has a time point of interest removed from the sample time series. The absolute trend impact factor for a frequency time series can be based on the first trend impact and the second trend impact of each of the sample time series.

At 1212, a frequency interest score is determined for each time frequency time series based on the determined absolute percentage change factors and the determined absolute trend impact factors. The frequency interest score combines the absolute percentage change impact factor and the absolute trend impact factor for the frequency time series.

At 1214, the frequency interest score for the frequency time series is provided, for at least some of the frequency time series. For instance, one or more highest ranked frequency interest scores can be provided. A highest ranked frequency interest score can correspond to the default frequency or to a frequency other than the default frequency. Determining the frequency interest score for a given frequency time series can include multiplying the absolute percentage change impact factor for the frequency time series by the absolute trend impact factor for the frequency time series.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving a request for an insight analysis for an input time series included in a dataset;
   identifying multiple frequencies to analyze;
   for each identified frequency to analyze, transforming the input time series into a frequency time series for the frequency;
   determining an absolute percentage change impact factor for each frequency time series, wherein the absolute percentage change impact factor for a given frequency time series indicates a magnitude of impact of an absolute percentage change between time points of the frequency time series;

determining an absolute trend impact factor for each frequency time series, wherein the absolute trend impact factor for a given frequency time series indicates an impact that a time series data point of focus has on the trend of the frequency time series;

determining, based on the determined absolute percentage change factors and the determined absolute trend impact factors, a frequency interest score, for each time frequency time series, that combines the absolute percentage change impact factor and the absolute trend impact factor for the frequency time series; and providing, for at least some of the frequency time series, the frequency interest score for the frequency time series.

2. The method of claim 1, wherein a higher frequency interest score for a frequency time series represents a higher level of insight provided by the frequency time series.

3. The method of claim 1, further comprising:
ranking frequency time series by frequency interest score; and
wherein providing frequency interest scores comprises providing ranked frequency interest scores.

4. The method of claim 3, wherein providing the frequency interest scores comprises:
determining a subset of highest-ranked frequency interest scores; and
providing the subset of highest ranked frequency interest scores.

5. The method of claim 1, wherein determining the frequency interest score for a given frequency time series comprises multiplying the absolute percentage change impact factor for the frequency time series by the absolute trend impact factor for the frequency time series.

6. The method of claim 1, herein determining the absolute percentage change impact factor for a frequency time series comprises generating an absolute percentage change time series from the frequency time series that reflects a percentage change between each time point in the frequency time series and a prior time point in the frequency time series.

7. The method of claim 6, wherein determining the absolute percentage change impact factor for a frequency time series comprises generating at least two sample absolute percentage change time series from the absolute percentage change time series generated from the frequency time series.

8. The method of claim 7, wherein the absolute percentage change impact factor for a frequency time series is based on a mean and a standard deviation of a shortest sample absolute percentage change time series and a mean and a standard deviation of a longest sample absolute percentage change time series.

9. The method of claim 1, wherein the absolute trend impact factor for a frequency time series indicates whether the frequency time series has an increasing trend or a decreasing trend.

10. The method of claim 1, wherein determining the absolute trend impact factor for a frequency time series comprises generating at least two sample time series based on the frequency time series.

11. The method of claim 10, wherein determining the absolute trend impact factor for a frequency time series comprises determining, for each sample time series, a first trend impact based on the sample time series and a second trend impact based on a reduced sample time series that has a time point of interest removed from the sample time series.

12. The method of claim 11, wherein the absolute trend impact factor for a frequency time series is based on the first trend impact and the second trend impact of each of the sample time series.

13. The method of claim 1, wherein the input time series has time points organized at a default frequency.

14. The method of claim 13, wherein a highest ranked frequency interest score corresponds to a frequency other than the default frequency.

15. The method of claim 1, wherein identifying multiple frequencies to analyze comprises identifying at least one predefined frequency selected from daily, weekly, monthly, bimonthly, semimonthly, quarterly, and annual frequencies.

16. A system comprising:
one or more processors; and
a non-transitory computer-readable medium coupled to the one or more processors having instructions stored thereon which, when executed by the one or more processors, cause the one or more processors to perform operations comprising:
receiving a request for an insight analysis for an input time series included in a dataset;
identifying, by the one or more processors, multiple frequencies to analyze;
for each identified frequency to analyze, transforming, by the one or more processors, the input time series into a frequency time series for the frequency;
determining, by the one or more processors, an absolute percentage change impact factor for each frequency time series, wherein the absolute percentage change impact factor for a given frequency time series indicates a magnitude of impact of an absolute percentage change between time points of the frequency time series;
determining, by the one or more processors, an absolute trend impact factor for each frequency time series, wherein the absolute trend impact factor for a given frequency time series indicates an impact that a time series data point of focus has on the trend of the frequency time series;
determining, by the one or more processors, based on the determined absolute percentage change factors and the determined absolute trend impact factors, a frequency interest score, for each time frequency time series, that combines the absolute percentage change impact factor and the absolute trend impact factor for the frequency time series; and
providing, for at least some of the frequency time series and by the one or more processors, the frequency interest score for the frequency time series.

17. The system of claim 16, wherein a higher frequency interest score for a frequency time series represents a higher level of insight provided by the frequency time series.

18. The system of claim 16, wherein determining the frequency interest score for a given frequency time series comprises multiplying the absolute percentage change impact factor for the frequency time series by the absolute trend impact factor for the frequency time series.

19. A computer program product encoded on a non-transitory storage medium, the product comprising non-transitory, computer readable instructions for causing one or more processors to perform operations comprising:
receiving a request for an insight analysis for an input time series included in a dataset;
identifying multiple frequencies to analyze;

for each identified frequency to analyze, transforming the input time series into a frequency time series for the frequency;

determining an absolute percentage change impact factor for each frequency time series, wherein the absolute percentage change impact factor for a given frequency time series indicates a magnitude of impact of an absolute percentage change between time points of the frequency time series;

determining an absolute trend impact factor for each frequency time series, wherein the absolute trend impact factor for a given frequency time series indicates an impact that a time series data point of focus has on the trend of the frequency time series;

determining, based on the determined absolute percentage change factors and the determined absolute trend impact factors, a frequency interest score, for each time frequency time series, that combines the absolute percentage change impact factor and the absolute trend impact factor for the frequency time series; and providing, for at least some of the frequency time series, the frequency interest score for the frequency time series.

20. The computer program product of claim 19, wherein a higher frequency interest score for a frequency time series represents a higher level of insight provided by the frequency time series.

\* \* \* \* \*